UNITED STATES PATENT OFFICE.

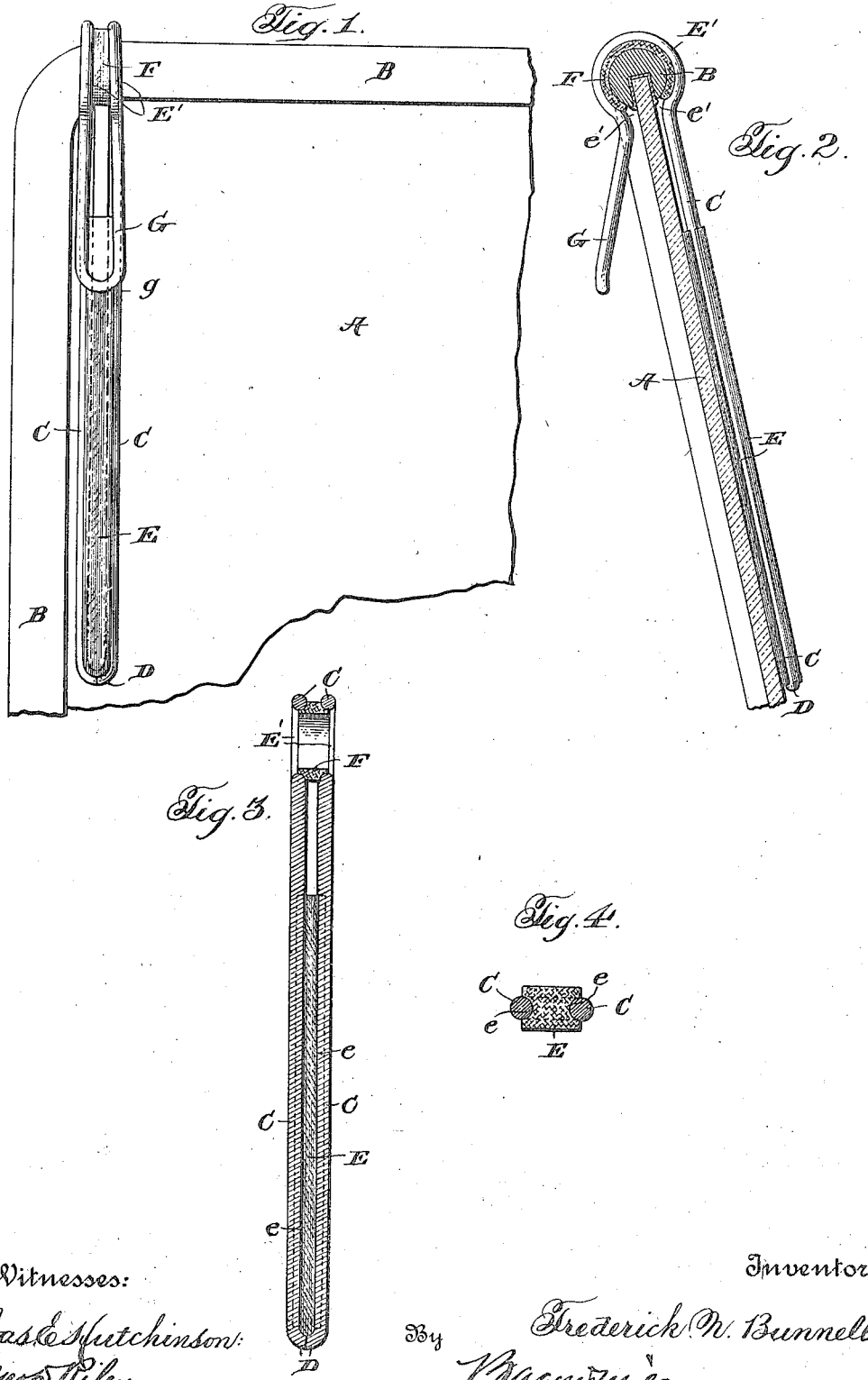

FREDERICK NORMAN BUNNELL, OF BARNEGAT, NEW JERSEY.

CLEARING DEVICE FOR AUTOMOBILE WIND-SHIELDS.

1,157,673.

Specification of Letters Patent.

Patented Oct. 26, 1915.

Application filed October 29, 1914. Serial No. 869,246.

*To all whom it may concern:*

Be it known that I, FREDERICK N. BUNNELL, a citizen of the United States, residing at Barnegat, in the county of Ocean and State of New Jersey, have invented certain new and useful Improvements in Clearing Devices for Automobile Wind-Shields, of which the following is a specification, reference being had therein to the accompanying drawing.

This invention relates to improvements in devices designed for cleaning the wind shields of automobiles and the like, of snow and rain or moisture while the machine is being driven, especially during a storm, for the obvious purpose of facilitating the maintenance of a clear vision for an operator during periods of time when most needed to avoid accidents and to prevent undue impediment to the progress of the machine.

The invention contemplates the provision of a device of the character stated comprising a wiping element adapted to be drawn across, while in contact with the glass or other transparent portion of the wind shield, and means for slidably supporting the same in place comprising a portion adapted to loop around the usual frame or the edge portion of the wind shield, associated with an accessible handle portion for moving the device back and forth, said device being of but slight width enabling it to normally occupy a position near one of the side edges of the frame of the wind shield without marring the appearance of the wind shield or constituting an objectionable obstruction when not in use.

To better disclose the present improvements I have illustrated herein the preferred embodiment of my invention and the special features thereof will be apparent from an inspection of the accompanying drawings forming part hereof when considered in connection with the detail description hereinafter contained.

In the drawings: Figure 1 is a front view of a portion of an ordinary type of wind shield in connection with which my device is capable of service, as shown; Fig. 2 is a cross sectional view through the same showing the device in side elevation; Fig. 3 is a longitudinal vertical section of the attachment, and Fig. 4 is a transverse section of the same.

Referring more specifically to the drawings wherein like reference letters refer to corresponding parts in the several views, A represents the glass or other transparent body portion of the conventional wind shield, the same being provided with the usual supporting and reinforcing metallic frame constituting the enlarged edge B.

As previously observed, my clearing device is adapted to be applied in a manner to slide over the frame B and it is preferable that the device may be readily attached to and detached from the wind shield at will, which objects are accomplished by the structure now to be defined.

C—C are upright side members or bars of a frame consisting of a continuous metallic round metal rod, said bars being spaced apart to a slight extent and joined together at their lower ends, as represented at D, these side bars constituting a clamp for confining therebetween and in a manner to embrace the connecting portion D, as well as the side bars, a rubber or equivalent cleaner E, the latter comprising conveniently an elongated block formation, grooved at the side edges and bottom, as at $e$, to constitute a receiving channel for the bars C and bottom portion D, this interlocking of the parts serving to effectually maintain the rubber block in position and permitting the rubber to be reversed in the clamp when one surface thereof becomes worn. The upper ends of the side bars C are curved to form an approximately cylindrical loop E', contoured to fit the frame B, said loop being open at its lower portion $e'$ to permit the entrance and escape of the frame, when the device is forcibly attached or removed, the two members of the loop E embracing therebetween a soft packing, such as rubber, chamois or other suitable material F, secured by grooving the sides of the material and embedding the opposite loop portions therein, after the same manner of securing the rubber block E in place, the purpose of the packing being to avoid scratching of the metal frame over which the device is slid and to prevent metallic sounds when the device is at rest. The loop portions E' are contracted together, somewhat similar to the spacing of the main portions of the side bars C, accomplished by converging the upper ends of the side bars, as represented at $e'$, which converging also secures the rubber block E against creeping upwardly between the side bars, it being observed that the blocks E terminate at the point where the side bars converge. The opposite portions of the loop members E flare gradually outwardly and downwardly and are projected inwardly to a substantial extent away from the vertical plane of the side bars C and block E, all as represented at G, the ends being rounded and connected, as at g, to constitute a handle adapted to be grasped by the operator in shifting the cleaner across the face of the member to be cleared.

Normally it will be understood,—and this is clearly illustrated,—that the cleaning device occupies a position near one of the side members of the frame of the wind shield so that the same is inconspicuous, but when in the course of the travel of the machine the wind shield becomes clouded or bleared by accumulations of snow, rain or moisture, it is simply necessary for the operator to engage the handle G and slide the device across the wind shield which will wipe the same and restore it to a clear condition, one wiping being all that is usually required to that end, so that the device which I have furnished, simple and cheap in construction, will be subject to practically no wear save that flowing from the operation of the elements and will endure throughout a long period of usefulness. Of course when not in use the device may be detached from the wind shield and stored in some convenient place about the vehicle, the same being small in size and very light, in its construction.

While I have herein disclosed one special embodiment of the invention, it will be apparent to persons skilled in the art that the invention is capable of embodiment in other forms and devices without departing from the spirit thereof and as may be in keeping with the hereto appended claims.

Having thus described the invention, what is claimed is:

1. A cleaning attachment for wind shields of automobiles comprising a continuous supporting frame having a vertical portion and a loop portion adapted to slidably embrace the edge of the wind shield and be supported by such embracing action, and a strip of soft cleaning material carried thereby.

2. A cleaning attachment for wind shields of automobiles comprising a continuous supporting frame having a vertical portion, a strip of soft cleaning material carried thereby, and a loop portion adapted to slidably embrace the edge of a wind shield, in combination with a forwardly projecting part constituting a handle, said frame and handle being composed of wire adapted to embrace between vertical portions thereof the soft cleaning material.

3. A cleaning attachment for automobile wind shields comprising a frame having a vertical portion, a soft cleaning member carried thereby, a loop portion adapted to embrace the edge of a wind shield and be supported by such embracing action, and a packing in said loop portion, substantially as and for the purpose described.

4. A cleaning attachment for automobile wind shields comprising a frame having a vertical portion, a soft cleaning member carried thereby, a loop portion adapted to embrace the edge of a wind shield, and a packing in said loop portion, said packing being grooved in its sides, and opposite portions of the loop being embedded therein.

5. A cleaning attachment for automobile wind shields comprising a frame having a vertical portion, a loop portion adapted to grip the edge of the wind shield, and a handle portion, the same being formed of a continuous metallic member, and a cleaning member carried by the vertical portion, substantially as described.

6. A cleaning attachment for automobile wind shields comprising a frame having a vertical portion, a loop portion and a handle portion, the said frame being spaced in the vertical portion thereof to receive a cleaning element therebetween, and similarly spaced in the loop portion, and a packing positioned in said loop portion.

In testimony whereof I hereunto affix my signature in the presence of two witnesses.

FREDERICK NORMAN BUNNELL.

Witnesses:
HELEN W. BUNNELL,
ORMOND W. WRIGHT.